United States Patent [19]

Layland, Jr.

[11] Patent Number: 4,821,392

[45] Date of Patent: Apr. 18, 1989

[54] COUPLING SEPARATOR

[75] Inventor: Donald L. Layland, Jr., Yucaipa, Calif.

[73] Assignee: Romalayland Enterprises, Bellflower, Calif.

[21] Appl. No.: 139,724

[22] Filed: Dec. 30, 1987

[51] Int. Cl.⁴ .............................................. B23P 19/04

[52] U.S. Cl. ...................................... 29/267; 439/160

[58] Field of Search ............... 439/152, 144, 159, 160; 29/267, 239; 280/422, 421

[56] References Cited

U.S. PATENT DOCUMENTS

| | | | |
|---|---|---|---|
| 740,122 | 9/1903 | Greenwood | 29/267 |
| 788,398 | 4/1905 | Fladby | 29/267 X |
| 2,134,345 | 10/1938 | Sheeran | 173/361 |
| 2,429,327 | 10/1947 | Morgan | 29/267 |
| 2,476,735 | 7/1949 | Johnson | 439/160 |
| 2,653,006 | 9/1953 | Lewis | 254/131 |
| 2,894,763 | 7/1959 | Karnath et al. | 280/421 |
| 3,061,915 | 11/1962 | Puryear | 29/267 X |
| 3,873,068 | 3/1975 | Allen | 29/267 X |
| 4,334,376 | 6/1982 | Winslow | 29/267 X |
| 4,614,015 | 9/1986 | Nagare et al. | 29/239 |

FOREIGN PATENT DOCUMENTS

| | | | |
|---|---|---|---|
| 447585 | 8/1927 | Fed. Rep. of Germany | 29/267 |
| 731547 | 2/1943 | Fed. Rep. of Germany | 280/422 |
| 28268 | 12/1956 | Fed. Rep. of Germany | 280/422 |
| 2118786 | 11/1983 | United Kingdom | 439/152 |

*Primary Examiner*—William Briggs

*Attorney, Agent, or Firm*—Harlan P. Huebner

[57] ABSTRACT

An electrical coupling separator tool which includes a handle means and secured thereto is a bifurcated plug biasing means including plug engaging-biasing fingers to engage a surface upon which a fixed portion of an electrical coupling is mounted and to straddle a movable portion of the coupling so that hand and arm pressure applied to the handle portion will leverage the tool and disengage the movable portion form the fixed portion of the coupling.

7 Claims, 2 Drawing Sheets

FIG. 1a.
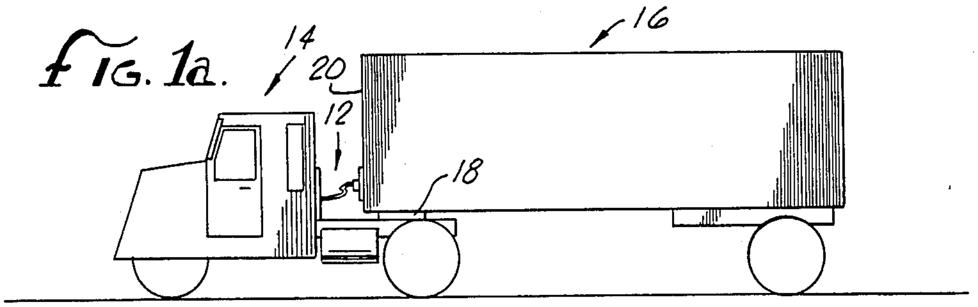
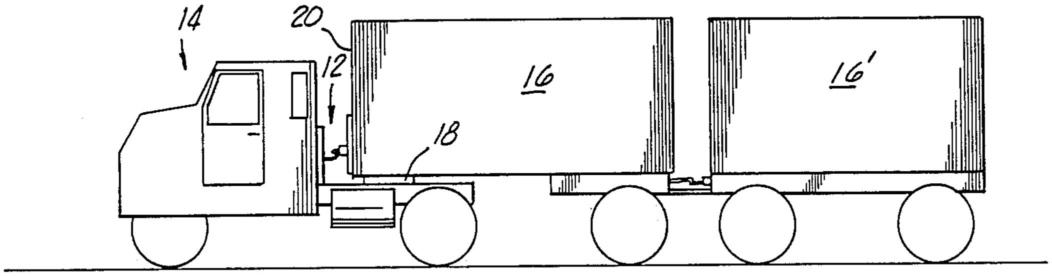
FIG. 1b.
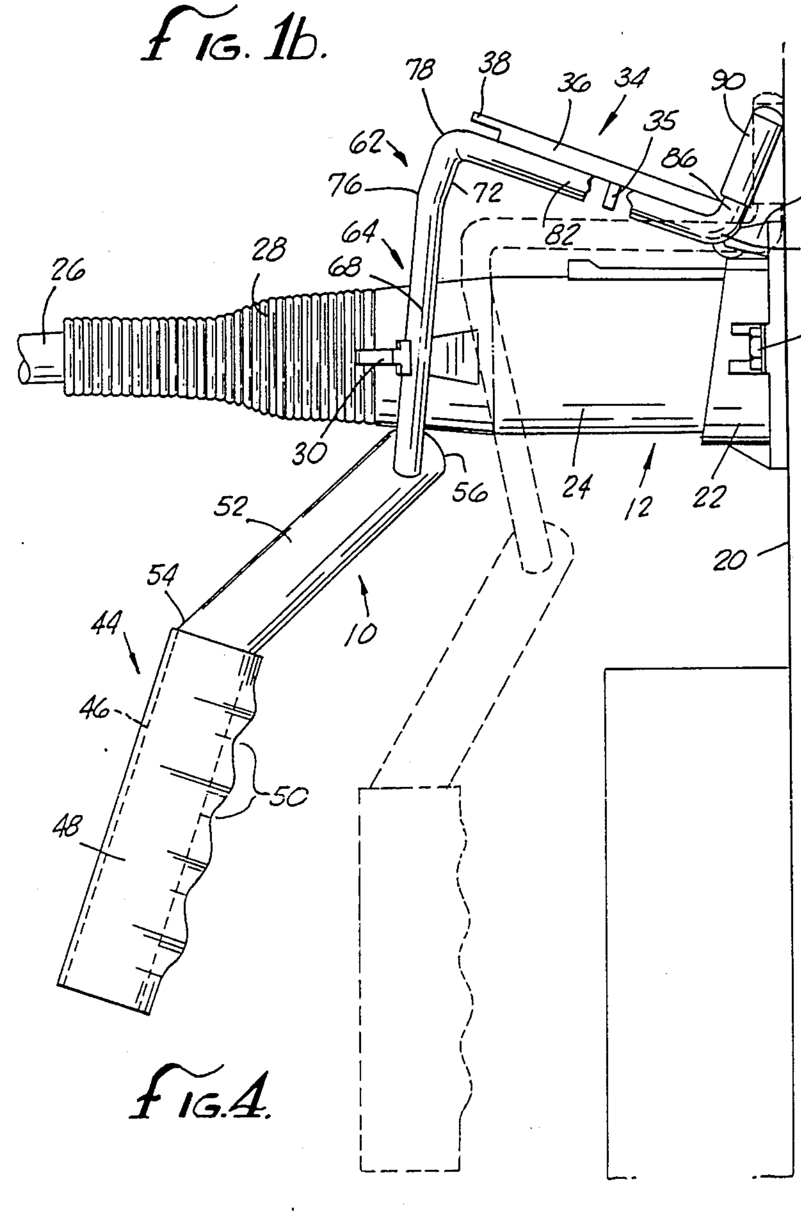
FIG. 4.
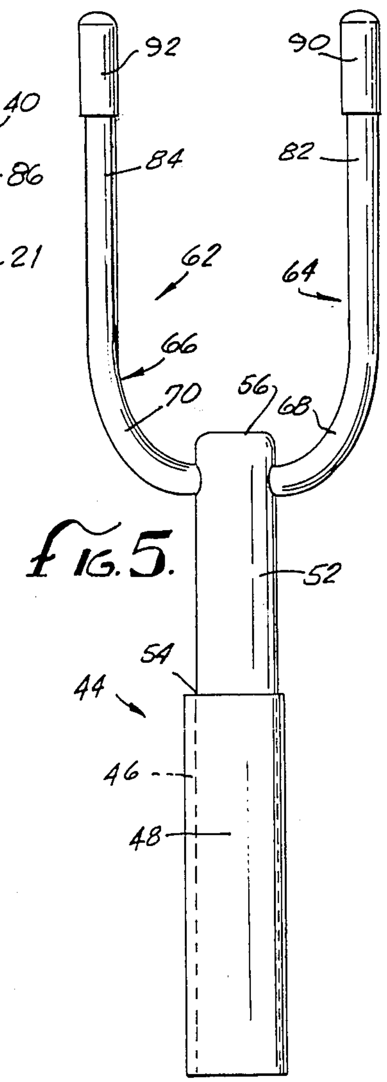
FIG. 5.

FIG. 2.
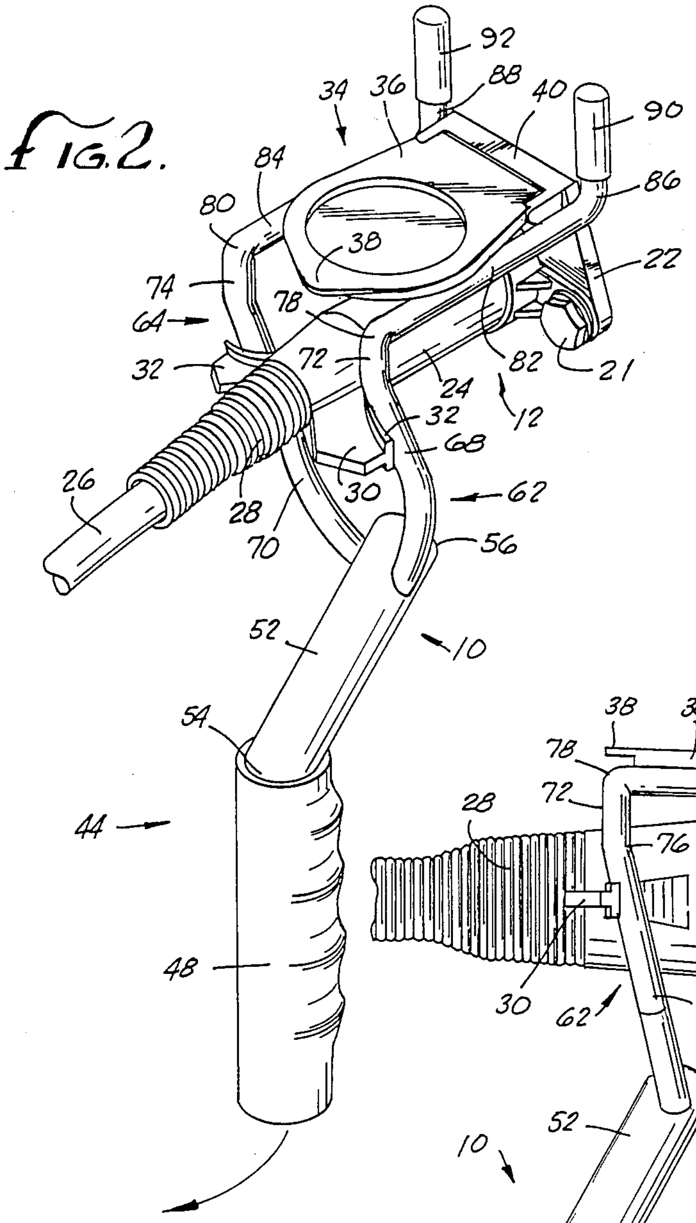
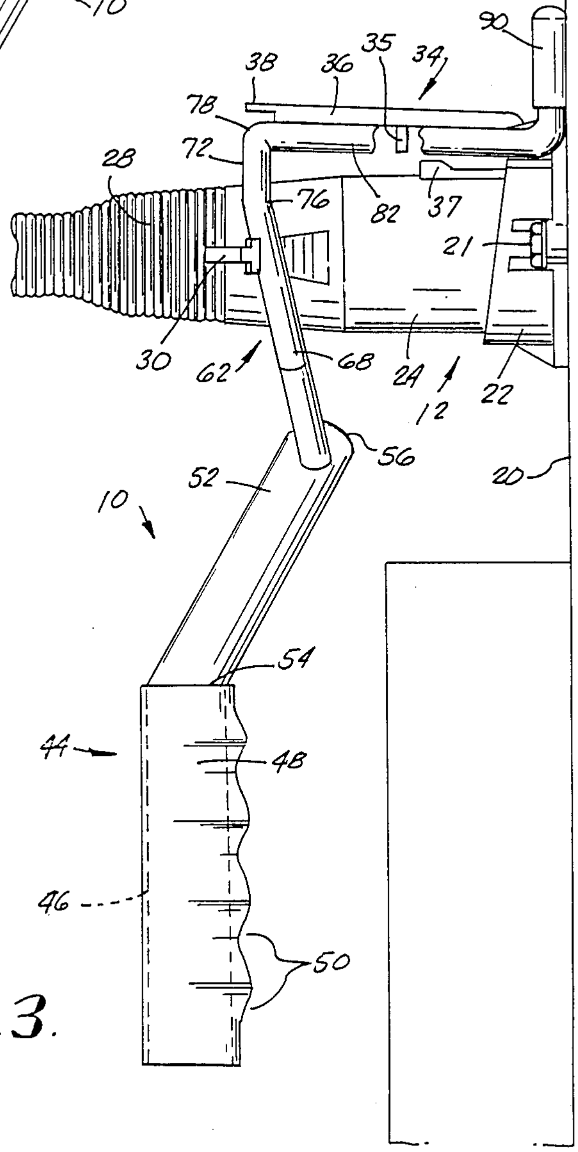
FIG. 3.

COUPLING SEPARATOR

BACKGROUND OF THE INVENTION

1. Field of the Invention

This invention relates to a tool for use in separating a two-piece plug such as an electric coupling plug for vehicular trailers.

2. Description of the Prior Art

With the use of trailers that are releasably attached to truck cabs it is necessary to run electrical current from the battery or other source to, i.e. brake lights, etc. on trailers. Because the trailers are releasable from the truck cabs for loading and unloading the wiring to the trailers is usually through a two-piece electrical plug.

There are a variety of conventional plugs, but generally all of them include a portion mounted on the front end of a trailer usually having a receptacle to receive pins from the other portion or plug of the electrical coupling. The plug is usually secured to a cable with a number of lines each running to a separate pin and the pin is mateable with the appropriate socket in the receptacle on the trailer.

Usually the receptacle portion of the coupling mounted on the trailer includes a hinged cover to protect the internal part of the receptacle from dirt and other foreign matter which may prevent proper contacts.

Heretofore when an electrical coupling is joined, that is the plug and receptacle are joined, in order to separate them the driver will pull the plug from the receptacle by hand. Generally, the conventional larger electrical couplings include opposed finger engaging projections that may be gripped and pulled on for the separation. However, with trucks subject to climatic conditions such as snow and rain quite often the couplings become jammed by dirt and snow or rain and the hand and arm are not strong enough to dislodge the plug portion from the receptacle.

Accordingly, sometimes hammers are used to hit the plug which often breaks the plug or causes damage to it. On the other hand some removals are forced by hand and arm pulling on the cable running to the plug. Such removal may not only pull the cable from the plug causing damage but the plug may give way quickly and the elbow might hit the cab, etc. This may cause elbow damage, bone breakage, or sprains.

Applicant is also aware of three types of electrical plug pullers such as those exemplified in U.S. Pat. Nos. 2,134,345; 2,894,763 and 4,614,015. In each of these patents the camming means to pry apart the plug is a permanent part of the plug. Further, they have the additional disadvantages of requiring a greater space to operate because in each of them the pressure exerted to dislodge or disconnect the plug is opposite to the direction of dislodgment. In addition, U.S. Pat. No. 2,894,763 uses the lever to dislodge from the cable a dust cover. Also the lever of U.S. Pat. No. 2,894,763 appears to push out the plug when activated.

There are also two additional prior art patents of which applicant is aware, however, in each case the present structure is not anticipated or rendered obvious. U.S. Pat. No. 2,429,327 is directed to a journal bearing extractor that includes a portion to reach inside a journal box and the tool is biased against the box in a direction opposite the withdrawal direction. The other U.S. Pat. No. 2,653,006 uses the camming principal to rotate a tool that engages a pipe to lift the same. Again, however, the fulcrum principle moves the tool in the opposite direction than the pipe to be lifted.

SUMMARY OF THE INVENTION

It is the purpose of the present invention to provide a separator tool to separate an electrical coupling which is light weight, portable and relatively easy to manufacture.

Another object of the present invention is to provide a separator tool that is adapted to be inserted against a surface a receptacle of an electrical coupling is mounted that will engage the plug portion of the receptacle and bias or cam the plug portion away from the receptacle.

A still further object of the present invention is to provide a separator tool that is constructed so that the direction of pull on the tool is in the same direction in which of the coupling is to move on dislodgment.

A further object of the invention is to provide a separator tool with a bifurcated engaging area to work on opposite sides of a plug to remove it from a receptacle.

A still further objective of the present invention is to a separator tool that includes bends and surfaces to engage the plug portion of an electrical coupling whereby biasing or camming may take place to cause the separation of parts.

These and other objects and advantages will become apparent from the following part of the specification wherein details have been described for the competence of disclosure, without intending to limit the scope of the invention which is set forth in the appended claims.

BRIEF DESCRIPTION OF THE DRAWINGS

These advantages may be more clearly understood from the following detailed description and by reference to the drawings in which:

FIGS. 1*a* and 1*b* are environmental side elevational views of a truck cab and trailer or trailers wherein electrical couplings are used to carry current from the truck cab to lights, and other needs on the trailers.

FIG. 2 is a perspective view of the separator tool of the present invention engaging an electrical coupling wherein the receptacle is mounted on a trailer;

FIG. 3 is a side elevational view of the separator tool of the present invention in place, similar to the placement of FIG. 2;

FIG. 4 is a view similar to FIG. 3 with the separator tool of the present invention biased outwardly and the plug portion of the coupling disengaged or partially disengaged; and FIG. 5 is top elevational view of the separator tool of the present invention.

DETAILED DESCRIPTION OF THE PREFERRED EMBODIMENT

The present invention an electrical coupling separator tool generally designated 10 is primarily adapted for use in separating conventional electrical couplings generally designated 12 that are found on truck cabs generally designated 14 and trailers generally designated 16 releasably connected thereto.

As can be seen in FIGS. 1*a* and 1*b* the truck cab 14 is of the conventional type with an engine, not seen, cab for a driver and conventional trailer coupling means 18 to releasable connect to the trailer 16 for transportation from one place to another. In FIG. 1*b* an additional trailer 16' may be coupled to the trailer 16 and again it is necessary to electrically couple trailer 16' to 16 to the truck cab 14 to assure proper electrical power will pass to the trailers 16 and 16'.

Usually the electrical coupling means 12 may be mounted on the forward wall 20 of a truck 16 by bolts 21 for ease of access and to prevent side exposure to traffic, etc. The electrical coupling means 12 is conventional in that the coupling 12 includes two parts, the receptacle 22 and plug 24. Usually the receptacle contains a recess, not seen, which includes a number of elongated contact receptacles which in turn are electrically connected to wires for trailer illumination, etc. The other half of the coupling 12, plug 24 includes an outer housing with a number of electrical pins (not seen) to plug into the elongated contact receptacles. The plug 24 has wires that are formed into a cable 26 running to the power source of the truck trailer 14. As seen in FIGS. 2, 3 and 4 a spiral armor shield 28 extends from the plug 24 to cover the cable 26 as it exits the plug 24. This spiral armor shield 28 will allow flexibility of the cable 26 and plug 24, yet will assist in reducing separation of the cable from the plug 24.

The plug 24 also is usually fitted with one or two ear projections 30 and 32 that extend outwardly from the sides of the plug 24. As can be seen in FIGS. 2, 3, and 4 they are fitted with curved inner finger surfaces 32 so that in normal circumstances the index and second finger of an individual may be inserted in the curved inner finger surfaces 32 and the plug 24 may be pulled out of the receptacle or socket 22.

Finally, with regard to the electrical coupling 12 the receptacle or socket portion 22 is fitted with an environmental cover generally designated 34. The cover includes a plate 36 including a finger tab 38 to lift it up. The plate 38 is hingedly mounted on the receptacle 22 by a hinge 40. In addition, the hinge 40 is usually spring loaded, not shown, so that the cover 34 is always closed against the receptacle when no plug 24 is inserted.

As can be seen in FIGS. 3 and 4 the underside of the cover 34 includes a lock catch 35 which can engage a stop 37 on the plug 24. This will help to retain the plug 24 in position until it is desired to remove it.

It can be appreciated that when the cover 34 is up and the plug 24 is inserted in the receptacle 22 dirt, dust and other foreign matter can enter between the plug and receptacle causing the two to stick and freeze together and not be easily separated. Also, with freezing or cold temperatures the parts may be so stuck together that pure hand and arm power is not enough to separate the two parts.

With the advent of the present invention, the electrical coupling separator tool 10 may be used under any type of weather conditions to bias the plug 24 away from the receptacle 22.

The electrical coupling separator tool 10 is preferably a single piece tool that includes a handle means 44 including a handle base portion 46 which is preferably tubular metal such as steel and has a longitudinal axis. The handle portion 46 is seen in dotted lines in FIGS. 3, 4 and 5 as it is preferably covered by a hand grip 48 which can slip on the handle portion. The grip 48 may be made of flexible plastic or rubber and has a plurality of finger depressions 50 so the tool 10 may be gripped and used to dislodge the plug 24.

Extending from the handle base portion 46 of the handle means 44 is a handle extension portion 52 of the same tubular material also having a longitudinal axis. The extension portion 52 is angled relative to the axis of the base portion 46 by means of a bend 54 and terminates in an end 56. The end 56 may be capped by appropriate means to prevent the entry of foreign matter.

Secured to the handle means 44 adjacent the end 56 of the means 44 is a yoke-like plug biasing means generally designated 62. Preferably the plug biasing means is formed from steel rods to assure the strength necessary to dislodge some extremely tight fitting plugs and receptacles or sockets.

The yoke-like plug biasing means 56 includes a pair of plug engaging-biasing fingers 64 and 66 which project outwardly and upwardly from the handle extension portion 52, see FIG. 5. Secured to the extension portion 52 by welding or other means are elongated plug ear engaging portions 68 and 70. The portions 68 and 70, as best seen in FIGS. 3 and 4, are angled upwardly and inwardly from an axis of the handle extension portion 52.

Extending upwardly from each plug ear engaging portion 68 and 70 are intermediate extensions 72 and 74 having longitudinal axes angled inwardly relative to the longitudinal axis of the portions 68 and 70. The angle is caused by a bend 76.

At the top of the intermediate extensions 68 and 70 the fingers 64 and 66 are bent 90° at bends 78 and 80 or normal to the longitudinal axes of the portions 68 and 70 forming elongated inwardly extending bridge portions 82 and 84 also each having a longitudinal axis.

Projecting upwardly normal to the axis of the bridge portions 82 and 84 are biasing end extensions 86 and 88 formed by bends 90 and 92. As can be seen in FIGS. 2, 3, 4 and 5 the biasing end extensions 86 and 88 are fitted with protection caps 90 and 92 respectively. The caps 90 and 92 may be rubber or plastic and may be premade and fitted over the extensions 86 or the extensions may be dipped in liquid plastic to form the protective caps.

In the preferred operation, as shown in FIGS. 2, 3, and 4 the tool 10 is held by the hand which grips the handle grip 48 and is positioned against a trailer wall 20 as seen in FIG. 3 or in dotted lines in FIG. 4. In addition the elongated plug ear engaging portions 68 and 70 straddle the plug 24 and will engage the plug ear projections 30 and 32.

With the advent of use on conventional electrical couplings 12 with cover plates 36 the plate 36 is opened by hand and the bridge portions 82 and 84 may be slipped under the cover 34 so that it is out of the way during removal of the plug 24. The cover 34 will rest on the portions 82 and 84 and because it is hinged, the cover can move with the tool 10.

Once the tool 10 is inserted the hand is pulled outwardly and upwardly away from the trailer wall 20, see FIG. 4. In this way the biasing end extensions 86 and 88 engage the wall 20 and the elongated plug ear engaging portions 68 and 70 being biased against the ears 30 will force the plug 24 outwardly in the same direction as the pulling force. In this way the plug 24 is dislodged and separated from the receptacle 22 without damaging the same or stripping the wires to the coupling, particularly when the coupling is frozen together.

Also by use of hand leverage there is control on the movement and if the space is restricted injury to an elbow will ordinarily be prevented.

While the drawings illustrate the use of tool 10 by inserting the same from the bottom of the electrical coupling 12 it should be realized that the tool 10 may be inserted from the top without departing from the spirit of the invention. In order to accomplish the alternative positioning the environment cover 34 is lifted by hand and held. The tool 10 will straddle the coupling 12 but the biasing end extensions 86 and 88 will engage the wall 20 underneath the coupling. Everything else remains the same as far as contacts. However, the handle means 44 is pulled downward and outward to dislodge the plug 24 from receptacle 22.

In addition, while the preferred structure utilizes a handle means 44 and yoke-like plug biasing mean 62 welded thereto, the tool 10 may be a single piece structure without the need of forming two pieces.

The invention and its attendant advantages will be understood from the foregoing description and it will be apparent that various changes may be made in the form, construction and arrangements of the parts without departing from the spirit and scope thereof or sacrificing its material advantages, the arrangements herein before described being merely by way of example. I do not wish to be restricted to the specific forms shown or uses mentioned, except as defined in the accompanying claims, wherein various portions have been separated for clarity of reading and not for emphasis.

I claim:

1. A coupling separator tool for use with a two-piece coupling to dislodge one piece from the other, said coupling being composed of a receptacle permanently mounted on an adjacent surface and a removable plug portion engagable with said receptacle, said removable plug portion including at least one ear projection which may be used for leverage removal of said plug, said separator tool including:

an elongated handle means including a handle base portion having a longitudinal axis and a handle extension portion projecting outwardly of said base portion at an angle offset from said longitudinal axis wherein said handle base portion is spaced farther from said surface when said tool is in a working position, said handle extension portion having a longitudinal axis;

a yoke plug biasing means fixedly extending from said handle extension portion including a pair of spaced apart plug engaging-biasing fingers adapted to straddle said plug and having end portions adapted to engage said surface and act as pivot points for said tool and said fingers having intermediate portions between said handle and said end portions lying in a plane offset from said handle extension portion longitudinal axis at least one of which is adapted to engage said plug ear projection whereby when outward hand pressure is exerted on said handle means said plug biasing means will leverage said tool against said surface and bias against at least one of said ears to disengage said removable plug portion in the same general initial direction as the applied force.

2. A coupling separator tool as defined in claim 1 wherein:

there are a pair of plug ear projections on said plug and each finger includes an intermediate portion to respectively engage each of said ear projections for the plug removal.

3. A coupling separator tool as defined in claim 1 wherein a hand grip of a material other than said elongated handle means encloses said handle base portion.

4. A coupling separator tool as defined in claim 1 wherein each of said plug engaging-biasing fingers are a single rod member bent at various complementary angles to each other and the space between said fingers is sufficient to straddle said plug portion of said coupling when it is desired to remove said plug.

5. A coupling separator tool as defined in claim 4 where each of said rod members include:

an elongated plug ear engaging portion projecting from said handle extension portion at an angle outward of the angle of said handle extension portion;

an intermediate extension projecting outwardly from said elongated plug ear engaging portion at a slight angle thereto;

an inwardly projecting bridge portion normal to said intermediate extension; and wherein said end portion is a biasing end extension projecting outwardly and normal to the plane of said bridge portion.

6. A coupling separator tool as defined in claim 5 wherein:

projection caps are located on said biasing end extensions to protect said surface during leverage of said tool to dislodge said plug.

7. A coupling separator tool as defined in claim 5 wherein said coupling includes a hinged cover with plug locking means adapted to retain said plug in contact with said receptacle; and said bridge portions of said plug engaging-biasing fingers are adapted to engage said cover when positioned for extraction and raise said cover with leverage applied to said tool whereby said plug locking means is disengaged by said tool.

* * * * *